Patented Oct. 5, 1948

2,450,747

UNITED STATES PATENT OFFICE 2,450,747

PHOTOGRAPHIC EMULSION CONTAINING NITRANILINE SULFONIC ACIDS

Burt H. Carroll, Rochester, N. Y., assignor to Eastman Kodak Company, Rochester, N. Y., a corporation of New Jersey No Drawing. Application February 7, 1946, Serial No. 646,205. In Great Britain February 9, 1945

4 Claims. (Cl. 95—7)

This invention relates to photographic sensitive silver halide emulsions.

In Davey and Selwyn U. S. patent application Serial No. 548,558 now U. S. Patent 2,403,708 there has been described and claimed the method of reducing the gamma given by a light sensitive silver halide emulsion layer in the region 350 to 400 mu which comprises incorporating diffusely in the emulsion (preferably prior to coating) a substance which does not sensitize the emulsion and for all practical purposes has no deleterious action on the emulsion but having a light absorption maximum lying between 350 and 400 mu and a lesser absorption from 350 mu to 250 mu. There has also been described and claimed therein certain light sensitive silver halide emulsion layers containing a substance of the kind just referred to.

According to the present invention there is now proposed to employ in the invention of application Serial No. 548,558, now U. S. Patent 2,403,708 as the said substance, one which contains a sulphonic acid group in the molecule which latter substances have special advantages.

Thus in the said specification it has been proposed to employ nitranilines having the properties referred to therein. In the said specification, p-nitraniline and m-nitraniline are specifically named. Examples of substances which are now proposed are, 1. 1 - amino - 4 - nitrobenzene - 2 - sulphonic acid whose maximum absorption is at 370 mu.
2. 1 - amino - 2 - nitrobenzene - 4 - sulphonic acid whose maximum absorption is at 390 mu.

These substances are best used as their water-soluble salts, such as their sodium, potassium or ammonium salts. Typical amounts to use are 0.5 to 10.0 grams per liter of liquid emulsion ready for coating, the exact amount depending on the gammas given by the emulsion before such addition. An advantage of such substances is their relatively high solubility, whereby they can be used in relatively high concentrations in the emulsions without fear of undesirable after effects from crystallization as can sometimes happen with the nitranilines named in the parent specification. Another advantage of these sulphonic derivatives is that they appear to have even less tendency to cause undesired desensitization of the emulsion. Another advantage is that there is no restriction on the pH of the emulsion imposed by the solubility of the compounds. The sulfonic acids of the nitroanilines are readily soluble at any pH commonly used in photographic emulsions.

EXAMPLE

To one liter of gelatino-silver halide emulsion containing 52 grams of gelatin and an amount of silver halide equivalent to 50 grams of silver nitrate, there was added 3.75 grams of the sodium salt of 1-amino-4-nitrobenzene-2-sulfonic acid. Coatings were made from this and from the control emulsion without the addition of the absorbent, and the contrasts of the two coatings at a series of wavelengths in the ultraviolet were measured by an exposure in a spectrograph having quartz optics and provided with a rotating sector over the entrance slit. The values of gamma at these wavelengths are listed in the accompanying table which clearly shows the superior uniformity of contrast in the region from 320–366 mu, provided by the addition of the 1-amino-4-nitrobenzene-2-sulfonic acid.

*Gamma of plate in ultraviolet*

|  | 366 mu | 340 mu | 320 mu | 300 mu | 280 mu | 260 mu | 254 mu |
| --- | --- | --- | --- | --- | --- | --- | --- |
| Control | 1.80 | 1.36 | 1.28 | 1.32 | 1.36 | 1.32 | 1.28 |
| 3.75 g. of p-nitroaniline o-sulfonic acid (as sodium salt) per liter of emulsion | 1.08 | 1.08 | 1.12 | 1.12 | 1.16 | 1.20 | 1.20 |

The table gives the value of gamma at the wave lengths indicated for the original emulsion and the experiment. The improvement in the region from 320–366 mu is obvious.

I claim:

1. A light sensitive silver halide emulsion layer diffusely containing a nitraniline selected from the group consisting of at least one of the sulphonic acids of o-nitraniline and p-nitraniline and their water-soluble salts, which does not sensitize the emulsion and for all practical purposes has no deleterious action on the emulsion but has a light absorption maximum lying between 350 and 400 millimicrons.

2. A light sensitive silver halide emulsion containing between 0.5 and 10.0 grams per litre of liquid emulsion of a nitraniline selected from the class consisting of at least one of the sulphonic acids of ortho-nitraniline and para-nitraniline and their water-soluble salts.

3. A light sensitive silver halide emulsion according to claim 1 in which the nitraniline is 1-amino-4-nitrobenzene-2-sulphonic acid.

4. A light sensitive silver halide emulsion according to claim 1 in which the nitraniline is 1-amino-2-nitrobenzene-4-sulphonic acid.

BURT H. CARROLL.

REFERENCES CITED

The following references are of record in the file of this patent:

UNITED STATES PATENTS

| Number | Name | Date |
| --- | --- | --- |
| 2,186,849 | Wilmanns et al. | Jan. 9, 1940 |
| 2,403,708 | Davey et al. | July 9, 1946 |